July 22, 1952

R. F. KOHR 2,604,319

TORSION SPRING SUSPENSION

Filed Jan. 19, 1946

Robert F. Kohr
INVENTOR

E.C. McRae
R. Y. Harris
J. R. Faulkner
T. H. Oster
ATTORNEYS

July 22, 1952  R. F. KOHR  2,604,319
TORSION SPRING SUSPENSION
Filed Jan. 19, 1946  2 SHEETS—SHEET 2

Robert F. Kohr
INVENTOR
E. Q. McRae – J. R. Faulkner
R. L. Harris – F. H. Oster
ATTORNEYS Patented July 22, 1952

2,604,319

UNITED STATES PATENT OFFICE 2,604,319

TORSION SPRING SUSPENSION

Robert F. Kohr, Birmingham, Mich., assignor to Ford Motor Company, Dearborn, Mich., a corporation of Delaware Application January 19, 1946, Serial No. 642,197

8 Claims. (Cl. 267—57)

This invention relates generally to a vehicle suspension; and, more particularly, to a vehicle suspension of the torsion spring type.

Torsion springs have heretofore been used in connection with vehicle suspension systems of the type employing a pair of vertically spaced, transversely extending levers pivotally connected at their inner ends to the vehicle frame and at their outer ends to a wheel carrier supporting the road wheel. In many such constructions, the torsion spring is in the form of a bar or rod and is directly connected to one of the levers of the suspension and forms the pivotal axis for the lever. Although arranging the torsion spring concentric with the pivotal axis of the lever results in placing the torsion spring under pure torsional stress, certain disadvantages result. For example, proper lubrication of the bearings for the lever is rendered difficult. Other problems of clearance and construction are also involved.

Certain of the foregoing disadvantages are obviated by a construction in which the torsion spring is spaced laterally from the pivotal axis of the lever. With this arrangement, however, as the suspension lever is raised and lowered, the torsion spring is subjected, not to a true torsional stress but to a combination of torsion and bending. Although a slight amount of bending stress in a torsion spring may not be serious, it is advisable to confine the stress in the spring to as nearly pure torsion as possible.

It is therefore an object of the present invention to provide a vehicle suspension of the pivoted lever type, in which the torsion spring is spaced from the pivotal axis of the lever, yet in which the stress in the bar is confined to torsion, and bending stress is eliminated.

Another object of the invention is to provide a vehicle suspension of the torsion spring type in which the torsion spring extends at a small angle of inclination to the pivotal axis of the suspension lever. The arrangement is such that the torsion spring has a point of support with a frame member of the vehicle which is substantially in alignment with the axis of the lever, and has a point of support with the lever which is spaced laterally from the axis of the lever. During the pivotal movement of the suspension lever about its axis, the torsion spring moves in the surface of a cone whose axis is the pivotal axis of the lever and whose vertex is the point of support between the torsion spring and the vehicle frame.

A still further object is to provide a torsion spring suspension for an independently sprung front wheel in which a torsion spring having a straight body portion and curved U-shaped ends is utilized, with the U-shaped ends respectively adjacent the front wheel suspension and a frame member, and in which the body portion of the torsion spring is subjected only to torsional stresses.

Other objects and advantages of this invention will be made more apparent as this description proceeds, particularly when considered in connection with the accompanying drawings, in which.

Figure 1:
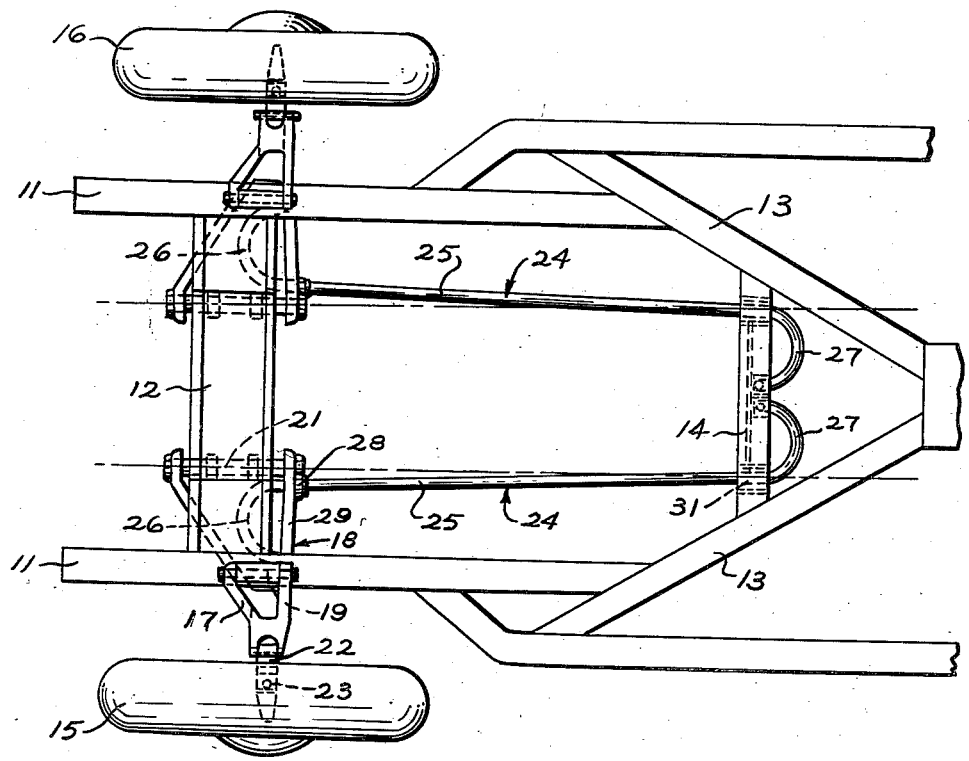
Figure 1 is a plan view of the front portion of a motor vehicle chassis equipped with a torsion spring suspension embodying the present invention.
Figure 2:
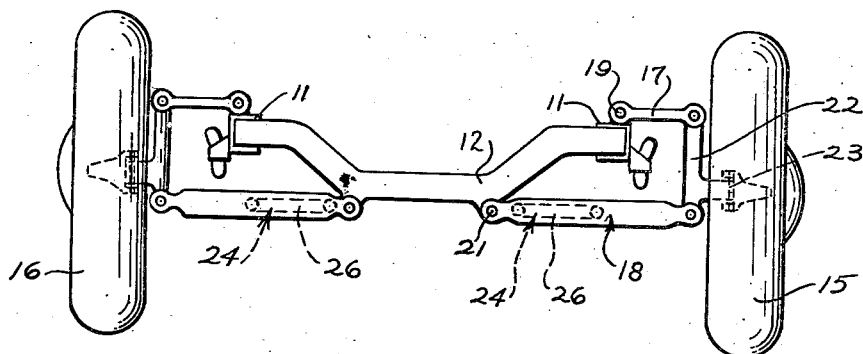
Figure 2 is a front end elevation of the construction shown in Figure 1.
Figure 3:
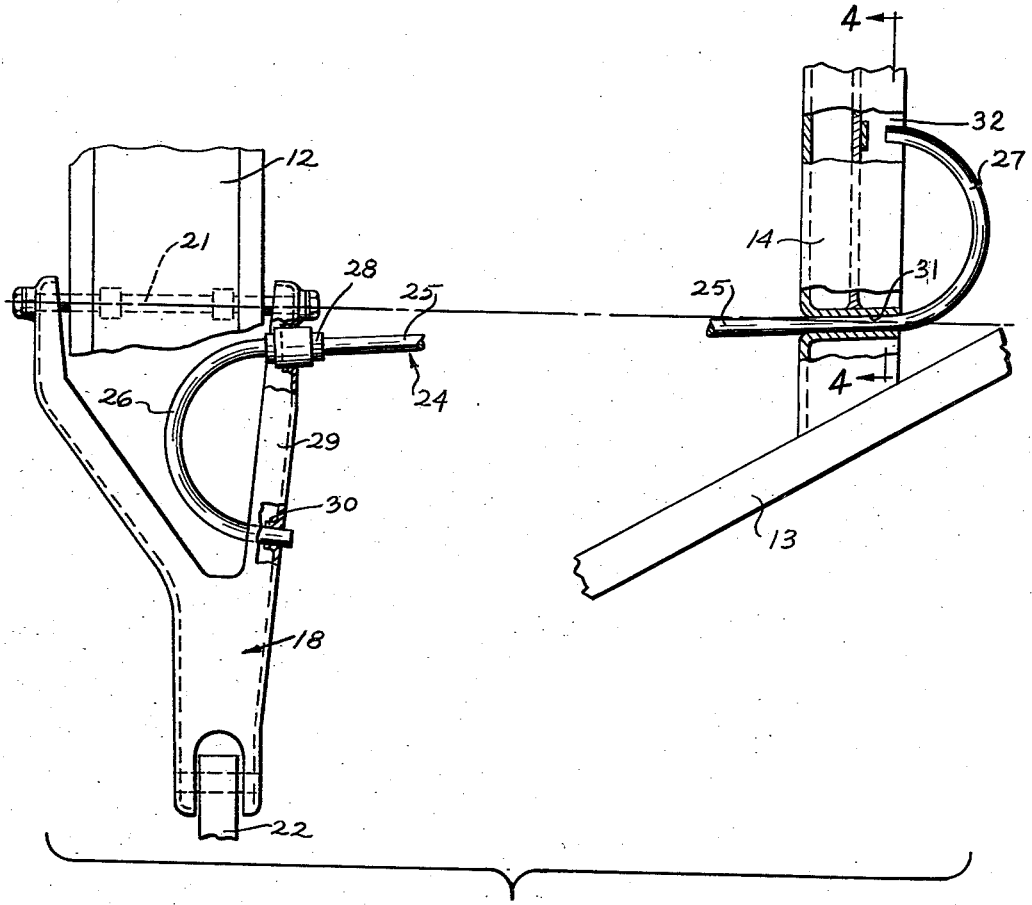
Figure 3 is an enlarged fragmentary plan view of a portion of Figure 1.
Figure 4:
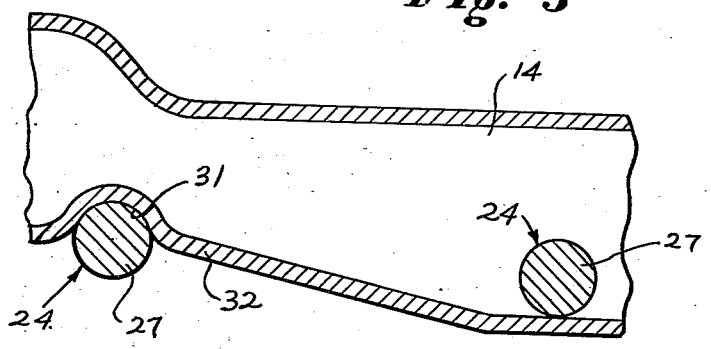
Figure 4 is an enlarged cross sectional view taken substantially on the line 4—4 of Figure 3.

Referring now more particularly to the drawing, the reference character 11 indicates the side members of a vehicle frame of the conventional type having a front cross member 12, X-frame members 13, and a transverse frame member 14 supported between the X-members. A pair of front road wheels 15 and 16 are independently mounted upon the vehicle frame by suspensions of the double lever type. Inasmuch as the suspension for each front wheel is identical, only that for the left front wheel will be described in detail.

A pair of vertically spaced levers 17 and 18 of a V or "wishbone" shape are pivotally mounted at their inner ends upon a side frame member 11 and the front cross member 12 respectively. The pivotal axes 19 and 21 for the levers 17 and 18, respectively, are generally horizontal and extend longitudinally of the vehicle. The outer ends of the levers 17 and 18 are pivotally connected to the upper and lower portions respectively of the wheel carrier 22 which supports the left front road wheel 15. The connection between the road wheel 15 and the wheel carrier 22 includes a kingpin 23, permitting the wheel to be steered by conventional steering linkage (not shown).

A torsion spring 24 in the form of a bar or rod extends generally longitudinally of the vehicle frame, and has a straight body portion 25 and curved U-shaped front and rear end portions 26 and 27, respectively. At its forward end, the straight body portion 25 of the torsion spring extends through a sleeve 28 carried in the rear arm 29 of the lower lever 18. It will be noted that the sleeve 28 is spaced laterally outwardly from the pivotal axis 21 of the lever, providing access to the bearings for lubrication purposes and simplifying the construction of the pivotal mounting of the lever. The free end of the front U-shaped portion 26 of the torsion spring extends through a second sleeve 30 formed in the rear arm 29 of the lower lever arm at a point spaced outwardly from sleeve 28.

As best seen in Figure 1, the straight body portion 25 of the torsion spring is inclined inwardly toward the pivotal axis 21 of the lower lever 18, intersecting the axis at a location determined by the angle of inclination between the torsion spring and the axis.

At the point of intersection between the torsion spring and the pivotal axis 21, the spring is received within a semicylindrical groove 31 formed on the lower side of the transverse frame member 14. The free end of the rear U-shaped portion 27 of the torsion spring rests upon the upper surface of the lower wall 32 of the frame member 14.

In operation, as the lower suspension lever 18 is swung about its pivotal axis 21, the straight body portion 25 of the torsion spring forms in effect an element of a cone whose axis is the pivotal axis of the lever 18 and whose vertex is the point of intersection between this pivotal axis and the torsion spring. The torsion spring thus moves in the surface of this imaginary cone during movement of the road wheel relative to the frame and, consequently, is subjected only to a torsional stress. No bending stress is present in the straight body portion of the torsion spring, therefore lengthening the life of the spring and improving its performance.

The embodiment of the invention shown utilizes a torsion spring having U-shaped ends but it will be apparent that other types of torsion springs may be used as well, such as torsion springs connected to the frame member and to the lever by flanges, splines, or other connecting means.

The construction of the torsion spring suspension for the right front wheel 16 is identical to that for the left front wheel 15, with the exception that the torsion spring is reversed laterally.

It will be understood that the invention is not to be limited to the exact construction shown and described, but that various changes and modifications may be made without departing from the spirit and scope of the invention, as defined in the appended claims.

What is claimed is:

1. In a vehicle having a frame and a road wheel, a supporting member carrying said wheel and pivotally mounted upon said frame, a torsion spring having a straight section, said straight section having a bearing engagement with said member at a point which is spaced radially from the pivotal axis between said member and said frame but lies closely adjacent said axis, the straight section of said torsion spring being inclined with respect to said pivotal axis and intersecting a continuation of said axis, said straight section having a bearing engagement with said frame at said intersection, and means connecting the opposite ends of said torsion spring to said supporting member and to said frame respectively.

2. In a vehicle having a frame and a road wheel, a supporting member carrying said wheel and pivotally mounted upon said frame, a torsion spring having a point of support with said member which is spaced from the pivotal axis between said member and said frame, said torsion spring having a straight section inclined with respect to said pivotal axis and intersecting a continuation of said axis, the straight section of said torsion spring and said frame having a common point of engagement located substantially at the intersection of said torsion spring with the continuation of said pivotal axis, and means connecting the opposite ends of said torsion spring to said supporting member and to said frame respectively.

3. In a vehicle having a frame and a road wheel, a supporting member carrying said wheel and pivotally mounted upon said frame, a torsion spring having a straight portion extending at a small angle of inclination to the pivotal axis between said supporting member and said frame, one end of said straight portion having supporting engagement with said frame at a point in axial alignment with said pivotal axis and the other end of said straight portion having supporting engagement with said member at a point spaced laterally from said pivotal axis, the straight portion of said torsion spring during the pivotal movement of said supporting member moving in the surface of a cone whose axis is said pivotal axis and whose vertex is the point of intersection between said axis and said torsion spring and means anchoring the opposite ends of said torsion spring to said supporting member and to said frame respectively.

4. A vehicle suspension comprising a frame, a pair of vertically spaced levers extending transversely of said frame and pivotally connected at their inner ends to said frame, a wheel carrier pivotally connected to the outer ends of said levers, a road wheel supported by said wheel carrier, and a torsion spring extending longitudinally of said frame and having a relatively long straight portion, the forward end of said straight portion having a point of support with one of said levers intermediate the pivotal connections of said lever to said frame and to said wheel carrier, said straight portion being inclined inwardly in a rearward direction towards the longitudinal center line of the vehicle, the rearward end of said straight portion bearing against said frame and means anchoring the opposite ends of said torsion spring to said supporting member and to said frame respectively.

5. A vehicle suspension comprising a frame, a pair of vertically spaced levers extending transversely of said frame and pivotally connected at their inner ends to said frame, a wheel carrier pivotally connected to the outer ends of said levers, a road wheel supported by said wheel carrier, and a torsion spring having a straight body portion and a U-shaped front end portion, one side of said U-shaped front end portion engaging one of said levers at a point located outwardly from the pivotal axis between said last-mentioned lever and said frame and the other side of said U-shaped front end portion engaging said last named lever at a point spaced outwardly from the point of engagement with said first named side, the body portion of said torsion spring being arranged in converging relation with said pivotal axis and adjacent its rearward end engaging said frame.

6. The structure of claim 5 which is further characterized in that the rearward end of said torsion spring engages said frame at a point coinciding with a continuation of the pivotal axis between said last-mentioned lever and said frame.

7. The structure of claim 5 which is further characterized in that the body portion of said torsion spring intersects a continuation of said last-mentioned pivotal axis and terminates in a U-shaped portion having a pair of transversely spaced points of support with said frame.

8. The structure of claim 5 which is further characterized in that the body portion of said torsion spring engages said frame substantially on a continuation of said pivotal axis and has a U-shaped rear end portion engaging said frame at a point spaced laterally from said pivotal axis.

ROBERT F. KOHR.

REFERENCES CITED

The following references are of record in the file of this patent:

UNITED STATES PATENTS

| Number | Name | Date |
|---|---|---|
| Re. 5,539 | Saladee | Apr. 15, 1873 |
| 300,978 | Hubbard | June 24, 1884 |
| 352,071 | Shaw | Nov. 2, 1886 |
| 2,024,199 | Barnes et al. | Dec. 17, 1935 |
| 2,130,431 | Rabe | Sept. 20, 1938 |
| 2,167,984 | Leighton | Aug. 1, 1939 |
| 2,223,741 | Rabe | Dec. 3, 1940 |
| 2,245,809 | Olley | June 17, 1941 |

FOREIGN PATENTS

| Number | Country | Date |
|---|---|---|
| 566,570 | Great Britain | Jan. 4, 1945 |